United States Patent Office 3,374,200
Patented Mar. 19, 1968

3,374,200
FLAME RETARDANT POLYACRYLATE RESINS
William George Deichert, Flushing, N.Y., assignor to American Cyanamid Company, Stamford, Conn., a corporation of Maine
No Drawing. Filed May 23, 1966, Ser. No. 551,946
10 Claims. (Cl. 260—45.75)

ABSTRACT OF THE DISCLOSURE

Polyacrylate resins are made resistant to burning and water-induced haziness by incorporating a stannic halide and a member of the group consisting of oxalic acid, zinc acetate and trichloroacetic acid.

---

This invention relates to water-resistant, flame-retarded compositions. More particularly this invention relates to water-resistant, flame-retarded compositions comprising an acrylate or methacrylate polymer containing (1) a flame-retarding amount of a stannic halide and (2) oxalic acid, zinc acetate or trichloroacetic acid. Still more particularly, this invention relates to novel, water-resistant, flame-retarded compositions comprising an acrylate or methacrylate polymer containing (1) a flame-retarding amount of a stannic halide having the formula (I)         $SnX_4$ wherein X is chlorine, bromine or iodine and (2) oxalic acid, magnesium acetate, zinc acetate or trichloroacetic acid.

The production of acrylate and methacrylate compositions which are flame-retardant, i.e. have high resistance to burning, is of considerable commercial importance. For example, such articles as castings, moldings or laminated structures and the like are required, or at least desired, to be resistant to fire and flame and to possess the ability to endure heat without deterioration. Typical illustrations of such applications include structural members such as wall coverings, wall paneling, windows and items such as skylights, shower stalls, room dividers and the like.

In application Ser. No. 551,945, of even date herewith, the use of stannic halides to impart flame-retardance to acrylate polymers is disclosed and claimed. These stannic halides impart flame-retardance to the polymers at concentrations of at least 10%.

The instant application discloses an improvement over said stannic halide flame-retarded compositions. That is to say, I have now found that the incorporation of oxalic acid, zinc acetate or trichloroacetic acid into the stannic halide-acrylate resin compositions results in compositions which are less susceptible to the damaging effects of water. More particularly, I have found that the incorporation of oxalic acid, zinc acetate or trichloroacetic acid into the stannic halide-acrylate resin system prevents haziness from forming in the resultant composition upon contact thereof with water, i.e. water per se or water in the form of a gas, e.g. humidity in the atmosphere. Furthermore, in some instances, the addition of the oxalic acid, zinc acetate or trichloroacetic acid not only imparts water-resistance to the ultimate acrylate product but also materially inhances the flame-retarding property of the stannic halide.

It is therefore an object of the present invention to provide novel, water-resistant, flame-retarded acrylate or methacrylate polymers.

It is a further object of the present invention to provide water-resistant, flame-retarded compositions comprising an acrylate or methacrylate polymer and (1) a flame-retarding amount of a stannic halide represented by Formula I, above, and (2) oxalic acid, zinc acetate or trichloroacetic acid.

These and further objects will become more apparent to those skilled in the art upon reading the more detailed description set forth hereinbelow.

The stannic halide-containing acrylate and methacrylate polymers into which the oxalic acid, zinc acetate or trichloroacetic acid may be incorporated to produce the novel water-resistant compositions of the present invention, are the acrylate and methacrylate polymers produced from monomers having the formula (II) 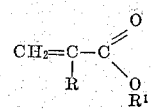

compositions. More particularlyfl this invention relates to wherein R is hydrogen or a methyl radical and $R^1$ is hydrogen or an alkyl radical having from 1 to 6 carbon atoms, inclusive. Examples of monomers represented by Formula II include acrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and the corresponding methyl, ethyl, n-propyl, isopropyl, n-butyl, t-butyl, isobutyl, n-amyl, t-amyl and hexyl methacrylates.

The acrylate and methacrylate polymers may be utilized as homopolymers or copolymers thereof in amounts such that the final polymers contain at least 30%, by weight, based on the total weight of the polymer, of the acrylate, methacrylate or mixture thereof.

Examples of monomers which can be copolymerized with the monomers represented in Formula II, either singly or in a plurality (two, three, four or any desired number), the latter often being desirable in order to improve the compatibility and copolymerization characteristics of the mixture of monomers and to obtain copolymers having the particular properties desired for the particular service application, in amounts up to about 70%, by weight, based on the total weight of the polymer, are such monomers as the unsaturated alcohol esters, more particularly the allyl, methallyl, vinyl, etc., esters of saturated and unsaturated aliphatic and aromatic monobasic and polybasic acids, such for instance, as acetic propionic, butyric, malonic, succinic, maleic, fumaric, citraconic, itaconic, benzoic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes; the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.

Other examples of monomers that can be copolymerized with the monomers of Formula II are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride, vinylidene iodide and the like.

More specific examples of allyl compounds that can be copolymerized with the allyl compounds of Formula II are allyl alcohol, methallyl alcohol, diallyl carbonate, allyl lactate, allyl α-hydroxyisobutyrate, allyl trichlorosilane, diallyl diglycol carbonate, diallyl methylgluconate, diallyl phthalate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl isocyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, the various substituted acrylonitriles (e.g., methacrylonitrile, ethacrylonitrile, phenylacrylonitrile, etc.); acrylamide and the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Also the glycol diacrylates, i.e. those compounds produced by esterifying acrylic or methacrylic acid with a polyglycol having 4–8 carbon atoms or a monoglycol having 2–4 carbon atoms. Examples of these glycols include diethylene glycol, triethylene glycol, tetraethylene glycol, dipropylene glycol, bis(4-hydroxybutyl) ether, polyethylene glycol, ethylene glycol, propylene glycol, the propanediols 1,2 and 1,3; the butanediols 1,2:1,3 and 1,4 and the like.

Of course, it is also possible to utilize copolymers produced from two or more of the monomers represented by Formula II, above and still obtain the benefits heretofore set forth.

The above mentioned monomers may be polymerized, copolymerized, etc., in any known manner such as by free-radical generating catalysts, irradiation, anion and/or cation-type catalysts and the like, the specific method of polymerization, however, forming no part of the present invention.

The stannic halide is present in the acrylate polymer in the form of stannic chloride, stannic bromide or stannic iodide per se and may also be added to the polymer as admixtures with one another. The oxalic acid, zinc acetate and trichloroacetic acid, may of course, be used in combination with a single halide or mixtures of halides in the acrylate polymer. The instant invention should, therefore, be construed as including both the use of single stannic halides or mixtures of two or more of the halides in addition to the water-resistance imparting additive. The stannic halides are incorporated, singly or in admixture, into the polymers in flame-retarding amounts, i.e. at least about 5%, by weight, and preferably from about 10% to about 20%, by weight, based on the weight of the polymer.

The oxalic acid, zinc acetate and trichloroacetic acid may be used in amounts of at least 0.1%, by weight, preferably 0.5% to 5.0%, by weight, based on the total weight of the polymer, stannic halide and water-resistance imparting additive.

The method of incorporating the water-resistance imparting additive into the polymer is not critical and any known method may be used. One method is to add the additive during the polymer or product production, i.e. during the polymerization or casting etc. The additive may also be added to a solvent solution of the polymer, which solvent is then removed by evaporation, etc. Additionally, the additive may be added to the polymer by (1) molding or extruding them simultaneously, (2) milling them on, for example, a two-roll mill, a Banbury mixer, etc., or (3) by merely blending the additive with the polymer in powder form.

The water-resistance imparting additive and the stannic halide flameproofing material may be added together, singly and in any order to the acrylate polymer utilizing, for example, any of the above-described incorporation techniques, without departing from the scope of the instant invention.

It should be noted that it is also within the scope of the present invention to incorporate such ingredients as plasticizers, dyes, pigments, stabilizers, antioxidants, antistatic agents, photochromic materials and the like to our novel compositions.

The compositions of the instant invention find use in any application generally afforded to acrylate polymers such as films, adhesives, molding compounds, glazing, etc. Additionally, they may be subjected to high temperature (i.e. 200–300° C.) to cause a foaming action therein resulting in structures whose properties suggest their usage as insulating materials.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retarding properties of any specific compound or combinations of compounds. One test which is reasonably efficient is ASTM test D–635–63. The specifications for this test are: a specimen, 5" in length, 0.5" in width and 0.125" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

An alternate test is to form a film of about 0.125" in thickness and place a burning match in contact therewith. If the film continues to burn after the match is removed, the film is not flame-proof.

*Example 1*

To 85 parts of methyl methacrylate are added 10 parts of $SnCl_4$, 5 parts of oxalic acid and 0.3 part of benzoyl peroxide. Upon polymerizing the resultant mixture between clamped glass plates at 55° C. for 16 hours, 70° C. for 1 hour and 105° C. for 1 hour, a cast sheet is recovered. Upon subjecting said sheet to the ASTM–D–635–63 flame-test specified above, percent burning is 19%. The Barcol hardness of the sheet is 40. The sheet is transparent and remains as such when immersed in water for 72 hours. When no $SnCl_4$ is present, the burning rate of poly(methyl methacrylate) is 100% according to the same test.

Following the procedure of Example 1, various other acrylate and methacrylate polymers were formed containing various additives according to the present invention. The results are set forth in Table I, below.

TABLE I

| Ex. | Polymer | Halide, Percent | Water-Resistance Imparting Additive, Percent | Percent Burn ASTM-D-635-63 | Match Test | Water-Contact [1] Results |
|---|---|---|---|---|---|---|
| 1 | Poly(methyl methacrylate) | $SnCl_4$, 10 | Oxalic acid, 5 | 19 | | No effect after 36 hours. |
| 2 (Comp.) | do | $SnCl_4$, 14 | | 19 | | Hazy after 24 hours. |
| 3 | Terpolymer of methyl methacrylate/acrylonitrile/acrylamide, 32.8/64.4/2.8. | $SnCl_4$, 15 | Zinc acetate, 2 | 30.0 | | No effect after 36 hours. |
| 4 (Comp.) | do | $SnCl_4$, 15 | | 33.6 | | Hazy after 24 hours |
| 5 | Methyl methacrylate/ethyl acrylate copolymer, 90/10. | $SnBr_4$, 10 | Trichloroacetic acid, 3 | | Self-extinguishing. | No effect after 36 hours. |
| 6 | Methyl methacrylate/styrene copolymer, 99/1. | $SnCl_4$, 15 | Zinc acetate, 0.5 | | do | Do. |
| 7 | Poly(ethyl acrylate) | $SnCl_4$, 14 | Oxalic acid, 0.1 | | do | Do. |
| 8 | Methyl methacrylate/vinyl acetate, 98/2. | $SnBr_4$, 4+$SnCl_4$, 4 | Oxalic acid, 3.0 | | do | Do. |
| 9 | Poly(n-hexyl acrylate) | $SnCl_4$, 5+$SnI_4$, 5 | Trichloroacetic acid, 2.0 | | do | Do. |
| 10 | N-hexyl methacrylate/acrylamide copolymer, 80/20. | $SnBr_4$, 10 | Zinc acetate, 2.0 | | do | Do. |
| 11 | Poly(acrylic acid) | $SnI_4$, 7 | Trichloroacetic acid, 1.0 | | do | Do. |
| 12 (Comp.) | Same as Ex. 5 | $SnBr_4$, 15 | | | do | Hazy after 24 hours. |
| 13 (Comp.) | Same as Ex. 6 | $SnCl_4$, 18 | | | do | Do. |
| 14 (Comp.) | Same as Ex. 7 | $SnCl_4$, 18 | | | do | Do. |
| 15 (Comp.) | Same as Ex. 8 | $SnBr_4$, 5+$SnCl_4$, 5 | | | do | Do. |
| 16 (Comp.) | Same as Ex. 9 | $SnCl_4$, 5+$SnI_4$, 5 | | | do | Do. |
| 17 (Comp.) | Same as Ex. 10 | $SnBr_4$, 12 | | | do | Do. |
| 18 (Comp.) | Same as Ex. 11 | $SnI_4$, 10 | | | do | Do. |
| 19 | Poly(methyl methacrylate) | $SnCl_2$, 12 | Zinc acetate, 5 | 38 | | No effect after 36 hours. |
| 20 | do | $SnCl_2$, 12 | Trichloroacetic acid, 5 | 38 | | Do. |

[1] Water Contact=Completely immersed in room temperature water.
(Comp.)=Comparative.

I claim:
1. A water-resistant, flame-retarded composition comprising a polymer of an acrylic monomer having the formula

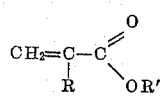

wherein R is selected from the group consisting of hydrogen and a methyl radical and R' is selected from the group consisting of hydrogen and an alkyl radical having from 1-6 carbon atoms, inclusive, having incorporated therein (1) a flame-retarding amount of an additive having the formula $$SnX_4$$

wherein X is selected from the group consisting of chlorine, bromine and iodine and (2) at least 0.1%, by weight, based on the weight of the composition, of a compound selected from the group consisting of oxalic acid, zinc acetate and trichloroacetic acid.

2. A composition according to claim 1 wherein said polymer contains up to 70%, by weight, based on the total weight of the polymer, of at least one ethylenically unsaturated monomer copolymerizable with said acrylic monomer.

3. A composition according to claim 1 wherein said polymer is poly(methyl methacrylate).

4. A composition according to claim 1 wherein said polymer is a copolymer of methyl methacrylate and acrylonitrile.

5. A composition according to claim 1 wherein said polymer is a copolymer of methyl methacrylate, acrylonitrile and acrylamide.

6. A composition according to claim 1 wherein (1) is stannic chloride and (2) is oxalic acid.

7. A composition according to claim 1 wherein (1) is stannic chloride and (2) is zinc acetate.

8. A composition according to claim 1 wherein (1) is stannic chloride and (2) is trichloroacetic acid.

9. A composition according to claim 1 wherein (1) is stannic bromide.

10. A composition according to claim 1 wherein (1) is stannic iodide.

References Cited
UNITED STATES PATENTS

| | | | |
|---|---|---|---|
| 1,793,420 | 2/1931 | Block | 252—7 |
| 1,895,691 | 1/1933 | Thomas et al. | 252—7 |
| 3,238,129 | 3/1966 | Veltman | 252—7 |
| 3,239,482 | 3/1966 | Rapp | 260—45.75 |

DONALD E. CZAJA, *Primary Examiner.*

V. P. HOKE, *Assistant Examiner.*